(12) United States Patent
Ranjbar et al.

(10) Patent No.: US 11,621,738 B1
(45) Date of Patent: Apr. 4, 2023

(54) BIDIRECTIONAL PHASE-BASED DISTANCE ESTIMATION WITH CRYSTAL OFFSET

(71) Applicant: Shenzhen Goodix Technology Co., Ltd., Shenzhen (CN)

(72) Inventors: Mohammad Ranjbar, San Diego, CA (US); Amir Dezfooliyan, San Diego, CA (US); Waleed Younis, San Diego, CA (US)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/491,455

(22) Filed: Sep. 30, 2021

(51) Int. Cl.
*H04B 1/3805* (2015.01)
*H04B 1/00* (2006.01)
*H04B 1/20* (2006.01)
*H04B 1/403* (2015.01)

(52) U.S. Cl.
CPC ......... *H04B 1/3805* (2013.01); *H04B 1/0014* (2013.01); *H04B 1/205* (2013.01); *H04B 1/403* (2013.01)

(58) Field of Classification Search
CPC .... H04B 1/3805; H04B 1/0014; H04B 1/205; H04B 1/403
See application file for complete search history.

(56) References Cited

U.S. PATENT DOCUMENTS

| 5,220,332 A | 6/1993 | Beckner et al. | |
|---|---|---|---|
| 2012/0019413 A1* | 1/2012 | Fretenburg | G01S 5/14 342/387 |
| 2014/0088966 A1* | 3/2014 | Harada | G10L 25/03 704/246 |
| 2018/0267155 A1* | 9/2018 | Shimizu | G01S 7/4912 |
| 2019/0227141 A1* | 7/2019 | Nishikawa | G01S 13/84 |

FOREIGN PATENT DOCUMENTS

FR 3105438 A1 6/2021

OTHER PUBLICATIONS

European Patent Office, Extended European Search Report Issued in Application No. 22188734.2, dated Jan. 24, 2023, Germany, 8 pages.

\* cited by examiner

*Primary Examiner* — Nguyen T Vo
(74) *Attorney, Agent, or Firm* — Kilpatrick Townsend & Stockton LLP

(57) ABSTRACT

A transceiver circuit is disclosed. The transceiver circuit includes an antenna, a receiver RF chain configured to receive a receiver RF signal from the antenna, a transmitter RF chain configured to transmit a transmitter RF signal to the antenna, and a controller configured to cause the receiver RF chain to receive a first distance estimate between the antenna and another transceiver circuit, to calculate a second distance estimate between the antenna and the other transceiver circuit, and to determine a range estimate between the antenna and the other transceiver circuit based on the first distance estimate and the second distance estimate.

13 Claims, 8 Drawing Sheets

BIDIRECTIONAL PHASE-BASED DISTANCE ESTIMATION WITH CRYSTAL OFFSET

TECHNICAL FIELD

The subject matter described herein relates to determining a distance (ranging) between two transceivers, and more particularly to determining the distance in the presence of crystal offset.

BACKGROUND

Distances between two communicating transceivers are increasingly used for various applications. For example, various Bluetooth Low Energy (BLE) and internet of things (IOT) applications require accurate distance measurements. Various distance measurement or ranging techniques are used to determine the distances between transceivers. Of these, phase-based ranging techniques are of increasing interest. Techniques for accurately calculating distances between transceivers in the presence of crystal offset are needed in the art.

SUMMARY

One inventive aspect is a transceiver circuit, including an antenna, a receiver RF chain configured to receive a receiver RF signal from the antenna, a transmitter RF chain configured to transmit a transmitter RF signal to the antenna, and a controller configured to cause the receiver RF chain to receive a first distance estimate between the antenna and another transceiver circuit, to calculate a second distance estimate between the antenna and the other transceiver circuit, and to determine a range estimate between the antenna and the other transceiver circuit based on the first distance estimate and the second distance estimate.

In some embodiments, the range estimate is equal to the average of the first distance estimate and the second distance estimate.

In some embodiments, the controller is further configured to cause the transmitter RF chain to transmit a first initiation signal to the antenna. In some embodiments, the first initiation signal is part of a first signal exchange, cause the receiver RF chain to receive a first reflection signal from the antenna. In some embodiments, the first reflection signal is part of the first signal exchange, cause the receiver RF chain to receive a second initiation signal from the antenna. In some embodiments, the second initiation signal is part of a second signal exchange, and cause the transmitter RF chain to transmit a second reflection signal from the antenna. In some embodiments, the second reflection signal is part of the second signal exchange.

In some embodiments, the controller is configured to calculate the second distance estimate based at least in part on the first initiation signal and the first reflection signal.

In some embodiments, the first initiation signal and the second reflection signal are transmitted at a particular working frequency. In some embodiments, the first reflection signal and the second initiation signal are received at the particular working frequency.

In some embodiments, the controller is configured to cause the transmitter RF chain to transmit a third initiation signal to the antenna, where the third initiation signal is part of a third signal exchange, cause the receiver RF chain to receive a third reflection signal from the antenna, where the third reflection signal is part of the third signal exchange, cause the receiver RF chain to receive a fourth initiation signal from the antenna, where the fourth initiation signal is part of a fourth signal exchange, cause the transmitter RF chain to transmit a fourth reflection signal from the antenna, where the fourth reflection signal is part of the fourth signal exchange, and calculate the first distance estimate based at least in part on the third initiation signal and the third reflection signal.

In some embodiments, the controller is configured to calculate the second distance estimate based at least in part on the third initiation signal and the third reflection signal.

In some embodiments, the first initiation signal and the second reflection signal are transmitted at a particular working frequency. In some embodiments, the first reflection signal and the second initiation signal are received at the particular working frequency. In some embodiments, the third initiation signal and the fourth reflection signal are transmitted at a second particular working frequency. In some embodiments, the third reflection signal and the fourth initiation signal are received at the second particular working frequency.

Another inventive aspect is a transceiver circuit, including an antenna, a receiver RF chain configured to receive a receiver RF signal from the antenna, a transmitter RF chain configured to transmit a transmitter RF signal to the antenna, and a controller configured to calculate a first distance estimate between the antenna and another transceiver circuit, and to cause the transmitter RF chain to transmit the first distance estimate between the antenna and the other transceiver circuit to the other transceiver circuit.

In some embodiments, calculating the first distance estimate includes the controller causing the receiver RF chain to receive a first initiation signal from the antenna, where the first initiation signal is part of a first signal exchange, the controller causing the transmitter RF chain to transmit a first reflection signal to the antenna, where the first reflection signal is part of the first signal exchange, the controller causing the transmitter RF chain to transmit a second initiation signal to the antenna, where the second initiation signal is part of a second signal exchange, the controller causing the receiver RF chain to receive a second reflection signal from the antenna, where the second reflection signal is part of the second signal exchange, and the controller determining the first distance estimate based at least in part on the first and second initiation signals and the first and second reflection signals.

In some embodiments, the first initiation signal and the second reflection signal are transmitted at a particular working frequency. In some embodiments, the first reflection signal and the second initiation signal are received at the particular working frequency.

In some embodiments, the controller is configured to cause the receiver RF chain to receive a third initiation signal from the antenna, where the third initiation signal is part of a third signal exchange, cause the transmitter RF chain to transmit a third reflection signal to the antenna, where the third reflection signal is part of the third signal exchange, cause the transmitter RF chain to transmit a fourth initiation signal to the antenna, where the fourth initiation signal is part of a fourth signal exchange, cause the receiver RF chain to receive a fourth reflection signal from the antenna, where the fourth reflection signal is part of the fourth signal exchange.

In some embodiments, the controller is configured to calculate the first distance estimate based at least in part on the third initiation signal and the third reflection signal.

In some embodiments, the first initiation signal and the second reflection signal are transmitted at a particular working frequency. In some embodiments, the first reflection signal and the second initiation signal are received at the particular working frequency. In some embodiments, the third initiation signal and the fourth reflection signal are transmitted at a second particular working frequency. In some embodiments, the third reflection signal and the fourth initiation signal are received at the second particular working frequency.

Another inventive aspect is a transceiver circuit, including an antenna, a receiver RF chain configured to receive a receiver RF signal from the antenna, a transmitter RF chain configured to transmit a transmitter RF signal to the antenna, and a controller configured to cause the transmitter RF chain to transmit a first signal to the antenna, where the first signal is part of a first signal exchange, cause the receiver RF chain to receive a second signal from the antenna, where the second signal is part of the first signal exchange and is part of a second signal exchange, cause the transmitter RF chain to transmit a third signal to the antenna, where the third signal is part of the second signal exchange, and calculate a range estimate based at least in part on the first, second, and third signals.

In some embodiments, the controller is further configured to cause the receiver RF chain to receive I/Q measurement data from the antenna, and calculate a range estimate based at least in part on the I/Q measurement data.

In some embodiments, the I/Q measurement data characterizes the first and third signals.

In some embodiments, the controller is further configured to cause the transmitter RF chain to transmit a fourth signal to the antenna, where the fourth signal is part of a third signal exchange, cause the receiver RF chain to receive a fifth signal from the antenna, where the fifth signal is part of the third signal exchange and is part of a fourth signal exchange, cause the transmitter RF chain to transmit a sixth signal to the antenna, where the sixth signal is part of the fourth signal exchange, and calculate a range estimate based at least in part on the fourth, fifth, and sixth signals, where the first and third signals are transmitted at a first working frequency. In some embodiments, the second signal is received at the first working frequency. In some embodiments, the fourth and sixth signals are transmitted at a second working frequency. In some embodiments, the fifth signal is received at the second working frequency.

In some embodiments, the controller is further configured to cause the receiver RF chain to receive I/Q measurement data from the antenna, and calculate a range estimate based at least in part on the I/Q measurement data.

In some embodiments, the I/Q measurement data characterizes the first, third, fourth, and sixth signals.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations.

When practical, similar reference numbers denote similar structures, features, or elements.

DETAILED DESCRIPTION

Particular embodiments of the invention are illustrated herein in conjunction with the drawings.

Various details are set forth herein as they relate to certain embodiments. However, the invention can also be implemented in ways which are different from those described herein. Modifications can be made to the discussed embodiments by those skilled in the art without departing from the invention. Therefore, the invention is not limited to particular embodiments disclosed herein.

Figure 1A:
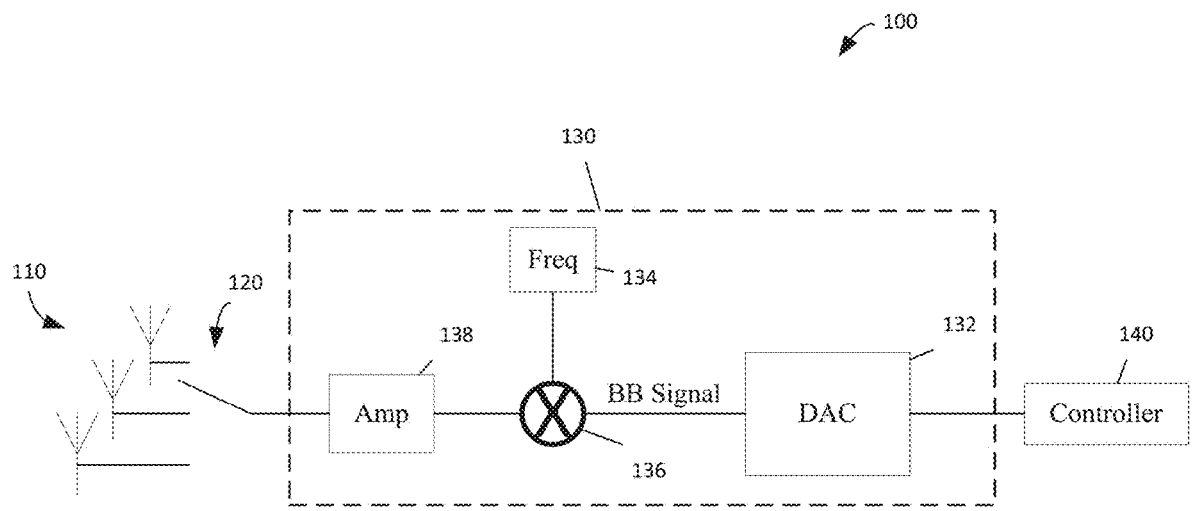
FIG. 1A is a schematic diagram of an embodiment of a transmitter circuit according to some embodiments.
Figure 1B:
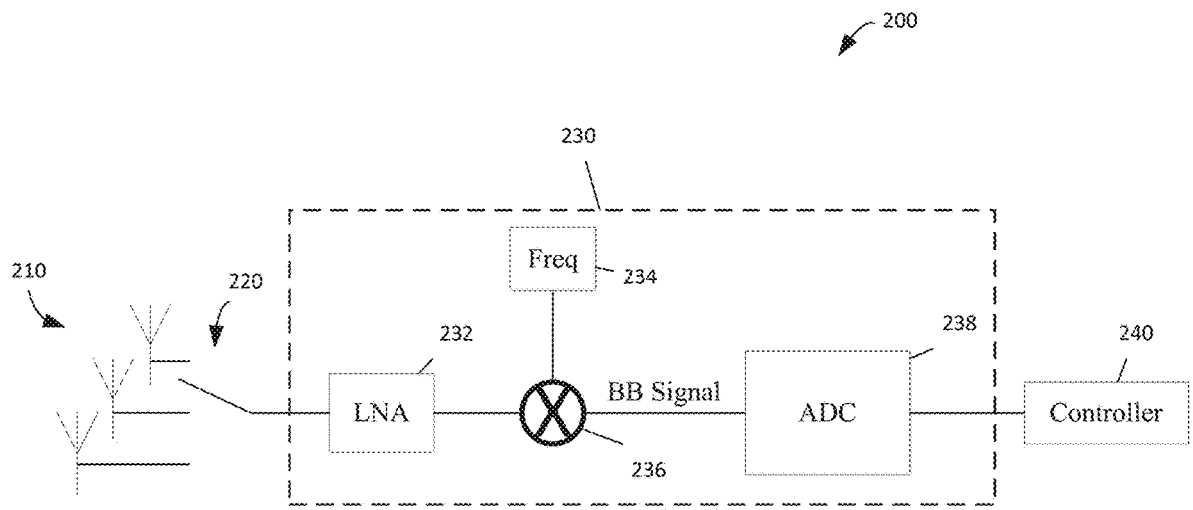
FIG. 1B is a schematic diagram of an embodiment of a receiver circuit according to some embodiments.
Figure 2:
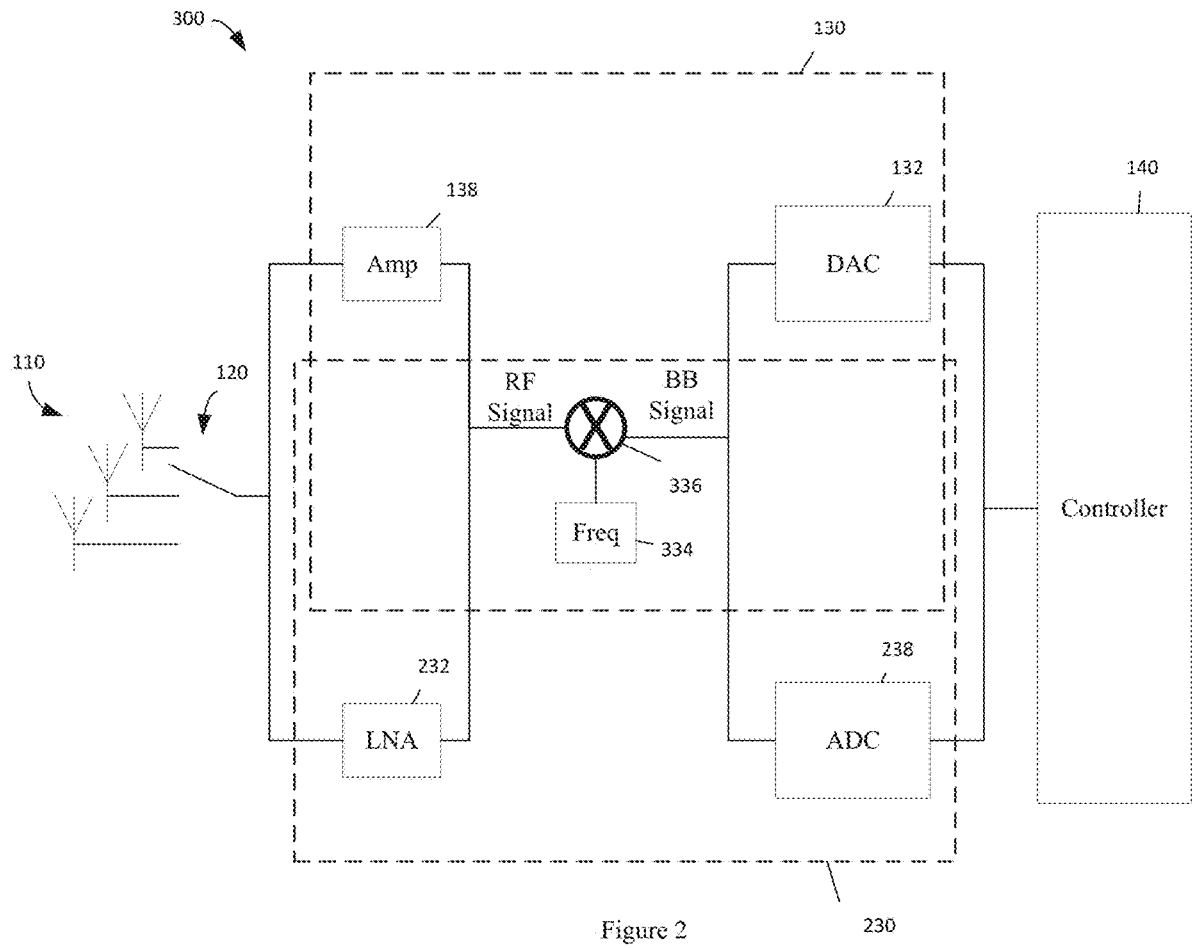
FIG. 2 is a schematic diagram of an embodiment of a transceiver circuit according to some embodiments.

Embodiments illustrate circuits and methods for determining a distance between first and second transceivers. The distances are determined using phased based methods in the presence of crystal offset. The distances are calculated using techniques which account for the crystal offset. FIGS. 1A and 1B respectively illustrate schematic diagrams of a receiver circuit and a transmitter circuit. FIG. 2 is a schematic diagram of an embodiment of a transceiver circuit according to some embodiments. FIGS. 3-9 are schematic diagrams and flowchart diagrams illustrating methods of determining a distance between first and second transceivers according to some embodiments.

FIG. 1A is a schematic diagram of an embodiment of a transmitter circuit 100 according to an embodiment. Transmitter circuit 100 includes antenna or antenna array 110, switch 120, RF chain 130, and controller 140. Transmitter circuit 100 illustrates a particular example. Other embodiments of transmitter circuits may be used.

Antenna or antenna array 110 may be any antenna or antenna array. For example, in some embodiments, antenna or antenna array 110 includes 1, 2, 3, 4, or more antennas. In some embodiments, antenna or antenna array 110 includes a linear antenna array. In some embodiments, antenna or antenna array 110 includes a two dimensional antenna array, for example, having multiple rows of linear antenna arrays.

In embodiments where antenna or antenna array 110 includes one antenna, the one antenna may be connected directly to RF chain 130, and switch 120 may be omitted. In embodiments where antenna or antenna array 110 includes multiple antennas, each antenna may be directly connected to a separate RF chain. Each of the RF chains may have the features of RF chain 130.

Antenna or antenna array 110 may be configured to transmit RF signals to a receiver circuit, such as receiver circuit 200 described below with reference to FIG. 1B. The RF signals include a high frequency signal at a carrier frequency modulated with a low frequency information signal. The high frequency signal is transmitted by one of the antennas from antenna or antenna array 110, for example, according to a programmable electrical connection formed by switch 120, as controlled by controller 140.

Controller 140 is configured to provide a digital signal to RF chain 130, where the digital signal encodes the information signal to be transmitted by antenna or antenna array 110.

RF chain 130 includes digital to analog converter (DAC) 132, mixer 136, frequency synthesizer 134, and power amplifier (PA) 138. RF chain 130 is an example only, and embodiments of other RF chains may alternatively be used. For example, in some embodiments, one or more amplifiers, and/or filters may be included, as understood by those of skill in the art.

The digital signal is processed by the digital to analog converter 132 to generate an analog baseband signal (BB signal) representing the digital signal, using techniques known in the art. Various digital to analog converter structures known in the art may be used.

Mixer 136 receives the analog baseband signal output from the digital to analog converter 132 and an oscillator signal at the carrier frequency generated by frequency synthesizer 134. In response to the analog baseband signal and the oscillator signal, mixer 136 up converts the analog baseband signal from the analog-to-digital converter 132 to a high frequency signal, using techniques known in the art. Various mixer structures known in the art may be used. The resulting high frequency signal is at the carrier frequency in this modulated so as to include the information of the low frequency information signal.

Power amplifier 138 is configured to receive the high frequency signal and to drive the high frequency signal to one of the antennas from antenna or antenna array 110, for example, according to a programmable electrical connection formed by switch 120, as controlled by controller 140. The power amplifier 138 drives the high frequency signal to one of the antennas using techniques known in the art. Various power amplifier structures known in the art may be used.

As understood by those of skill in the art, using communication connectivity not illustrated in FIG. 1A, control signals from controller 140 may control certain variable functionality of switch 120, power amplifier 138, frequency synthesizer 134, mixer 136, and digital to analog converter 132, for example, as understood by those of skill in the art.

The control signals from controller 140 may, for example, control switch 120 to control which of multiple antennas RF chain 130 drives the high frequency signal with.

In embodiments having multiple antennas each connected to one of multiple RF chains, controller 140 may generate control signals for each of the RF chains.

FIG. 1B is a schematic diagram of an embodiment of a receiver circuit 200 according to an embodiment. Receiver circuit 200 includes antenna or antenna array 210, switch 220, RF chain 230, and controller 240. Receiver circuit 200 illustrates a particular example. Other embodiments of receiver circuits may be used.

Antenna or antenna array 210 may be any antenna or antenna array. For example, in some embodiments, antenna or antenna array 210 includes 1, 2, 3, 4, or more antennas. In some embodiments, antenna or antenna array 210 includes a linear antenna array. In some embodiments, antenna or antenna array 210 includes a two dimensional antenna array, for example, having multiple rows of linear antenna arrays.

In embodiments where antenna or antenna array 210 includes one antenna, the one antenna may be connected directly to RF chain 230, and switch 220 may be omitted. In embodiments where antenna or antenna array 210 includes multiple antennas, each antenna may be directly connected to a separate RF chain. Each of the RF chains may have the features of RF chain 230.

Antenna or antenna array 210 may be configured to receive RF signals generated by a transmitter, such as transmitter 100 described above with reference to FIG. 1A.

RF chain 230 includes low noise amplifier (LNA) 232, frequency synthesizer 234, mixer 236, and analog to digital converter (ADC) 238. RF chain 230 is an example only, and embodiments of other RF chains may alternatively be used. For example, in some embodiments, one or more amplifiers, and/or filters may be included, as understood by those of skill in the art.

Low noise amplifier 232 is configured to receive a high frequency signal at a carrier frequency and modulated with a low frequency information signal. The high frequency signal is received from one of the antennas from antenna or antenna array 210, for example, according to a programmable electrical connection formed by switch 220, as controlled by controller 240. The high frequency signal is amplified by low noise amplifier 232 to generate an amplified RF signal, using techniques known in the art. Various low noise amplifier structures known in the art may be used.

Mixer 236 receives the amplified RF signal output from the low noise amplifier 232 and an oscillator signal at or substantially at the carrier frequency generated by frequency synthesizer 234. In response to the amplified RF signal and the oscillator signal, mixer 236 down converts the amplified RF signal from the low noise amplifier 232 to a baseband signal, using techniques known in the art. Various mixer structures known in the art may be used. The resulting baseband signal includes information of the low frequency information signal.

The baseband signal is then processed by the analog-to-digital converter 238 to generate a digital signal representing the baseband signal, using techniques known in the art. Various analog-to-digital converter structures known in the art may be used.

Controller 240 receives the digital representation of the baseband signal.

As understood by those of skill in the art, using communication connectivity not illustrated in FIG. 1B, control signals from controller 240 may control certain variable functionality of switch 220, low noise amplifier 232, frequency synthesizer 234, mixer 236, and analog-to-digital converter 238, for example, as understood by those of skill in the art.

The control signals from controller 240 may, for example, control switch 220 to select which of multiple antennas RF chain 230 receives the high frequency signals from.

For example, controller 240 may generate control signals which result in controller 240 receiving a group of digital signals, where each digital signal of the group is generated by RF chain 230 based on a high frequency signal received by a selected one of the antennas. In embodiments having multiple antennas each connected to one of multiple RF chains, controller 240 may generate control signals for each of the RF chains, such that controller 240 receives a group of digital signals, where each digital signal of the group is generated by one of the RF chains based on an RF signal received by the particular antenna connected thereto.

FIG. 2 is a schematic diagram of an embodiment of a transceiver circuit 300 according to some embodiments. Transceiver circuit 300 includes antenna or antenna array 110, switch 120, transmitter RF chain 130, receiver RF chain 230, and controller 140. Transceiver circuit 300 illustrates a particular example. Other embodiments of transceiver circuits may be used.

Antenna or antenna array 110 may be any antenna or antenna array. For example, in some embodiments, antenna or antenna array 110 includes 1, 2, 3, 4, or more antennas. In some embodiments, antenna or antenna array 110 includes a linear antenna array. In some embodiments, antenna or antenna array 110 includes a two dimensional antenna array, for example, having multiple rows of linear antenna arrays.

In embodiments where antenna or antenna array 110 includes one antenna, the one antenna may be connected directly to transmitter RF chain 130 and receiver RF chain 230, and switch 120 may be omitted. In embodiments where antenna or antenna array 110 includes multiple antennas, each antenna may be directly connected to a separate receiver RF chain. Each of the receiver RF chains may have the features of receiver RF chain 230. In embodiments where antenna or antenna array 110 includes multiple antennas, each antenna may be directly connected to a separate transmitter RF chain. Each of the transmitter RF chains may have the features of transmitter RF chain 130.

Antenna or antenna array 110 may be configured to transmit RF signals to a receiver circuit, such as receiver circuit 200, or to another transceiver circuit. The RF signals include a high frequency signal at a carrier frequency modulated with a low frequency information signal. The high frequency signal is transmitted by one of the antennas from antenna or antenna array 110, for example, according to a programmable electrical connection formed by switch 120, as controlled by controller 140.

Controller 140 is configured to provide a digital signal to RF chain 130, where the digital signal encodes the information signal to be transmitted by antenna or antenna array 110.

RF chain 130 includes digital to analog converter (DAC) 132, bidirectional mixer 336, frequency synthesizer 334, and power amplifier (PA) 138. RF chain 130 is an example only, and embodiments of other RF chains may alternatively be used. For example, in some embodiments, one or more amplifiers, and/or filters may be included, as understood by those of skill in the art.

The digital signal is processed by the digital to analog converter 132 to generate an analog baseband signal (BB signal) representing the digital signal, using techniques known in the art. Various digital to analog converter structures known in the art may be used.

Bidirectional mixer 336 receives the analog baseband signal output from the digital to analog converter 132 and an oscillator signal at the carrier frequency generated by frequency synthesizer 334. In response to the analog baseband signal and the oscillator signal, bidirectional mixer 336 up converts the analog baseband signal from the analog-to-digital converter 132 to a high frequency signal, using techniques known in the art. Various mixer structures known in the art may be used. The resulting high frequency signal is at the carrier frequency in this modulated so as to include the information of the low frequency information signal.

Power amplifier 138 is configured to receive the high frequency signal, and to drive the high frequency signal to one of the antennas from antenna or antenna array 110, for example, according to a programmable electrical connection formed by switch 120, as controlled by controller 140. The power amplifier 138 drives the high frequency signal to one of the antennas using techniques known in the art. Various power amplifier structures known in the art may be used.

As understood by those of skill in the art, using communication connectivity not illustrated in FIG. 2, control signals from controller 140 may control certain variable functionality of switch 120, power amplifier 138, frequency synthesizer 134, bidirectional mixer 336, and digital to analog converter 132, to cause transceiver circuit 300 to transmit data with RF signals, for example, as understood by those of skill in the art.

The control signals from controller 140 may, for example, control switch 120 to control which of multiple antennas RF chain 130 drives the high frequency signal with.

In embodiments having multiple antennas each connected to one of multiple transmitter RF chains, controller 140 may generate control signals for each of the transmitter RF chains.

In embodiments where antenna or antenna array 110 includes one antenna, the one antenna may be connected directly to receiver RF chain 230, and switch 120 may be omitted. In embodiments where antenna or antenna array 110 includes multiple antennas, each antenna may be directly connected to a separate receiver RF chain. Each of the receiver RF chains may have the features of receiver RF chain 230.

Antenna or antenna array 110 may be configured to receive RF signals generated by a transmitter, such as transmitter 100 or from another transceiver circuit.

RF chain 230 includes low noise amplifier (LNA) 232, frequency synthesizer 334, bidirectional mixer 336, and analog to digital converter (ADC) 238. RF chain 230 is an example only, and embodiments of other RF chains may alternatively be used. For example, in some embodiments, one or more amplifiers, and/or filters may be included, as understood by those of skill in the art.

Low noise amplifier 232 is configured to receive a high frequency signal at a carrier frequency and modulated with a low frequency information signal. The high frequency signal is received from one of the antennas from antenna or antenna array 110, for example, according to a programmable electrical connection formed by switch 120, as controlled by controller 140. The high frequency signal is amplified by low noise amplifier 232 to generate an amplified RF signal, using techniques known in the art. Various low noise amplifier structures known in the art may be used.

Bidirectional mixer 336 receives the amplified RF signal output from the low noise amplifier 232 and an oscillator signal at or substantially at the carrier frequency generated by frequency synthesizer 334. In response to the amplified RF signal and the oscillator signal, bidirectional mixer 336 down converts the amplified RF signal from the low noise amplifier 232 to a baseband signal, using techniques known in the art. Various mixer structures known in the art may be used. The resulting baseband signal includes information of the low frequency information signal.

The baseband signal is then processed by the analog-to-digital converter 238 to generate a digital signal representing the baseband signal, using techniques known in the art. Various analog-to-digital converter structures known in the art may be used.

Controller 140 receives the digital representation of the baseband signal.

As understood by those of skill in the art, using communication connectivity not illustrated in FIG. 2, control signals from controller 240 may control certain variable functionality of switch 120, low noise amplifier 232, frequency synthesizer 334, bidirectional mixer 336, and analog-to-digital converter 238, to cause transceiver circuit 300 to receive data from RF signals, for example, as understood by those of skill in the art.

The control signals from controller 140 may, for example, control switch 120 to select which of multiple antennas receiver RF chain 230 receives the high frequency signals from.

For example, controller 140 may generate control signals which result in controller 140 receiving a group of digital signals, where each digital signal of the group is generated by receiver RF chain 230 based on a high frequency signal received by a selected one of the antennas. In embodiments having multiple antennas each connected to one of multiple receiver RF chains, controller 140 may generate control signals for each of the receiver RF chains, such that controller 140 receives a group of digital signals, where each digital signal of the group is generated by one of the receiver RF chains based on an RF signal received by the particular antenna connected thereto.

Figure 3:
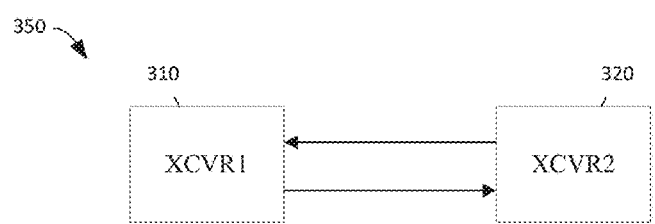
FIG. 3 is schematic diagram of first and second transceivers communicating wirelessly.

FIG. 3 is schematic diagram of a system 350 having first and second transceiver circuits 310 and 320 communicating wirelessly. Instantiations of transceiver circuit 300 may be used as either or both of first and second transceiver circuits 310 and 320. Each of first and second transceiver circuits 310 and 320 may have features similar or identical to that of transceiver circuit 300, discussed with reference to FIG. 2. Other transceiver circuits may be used as either or both of first and second transceiver circuits 310 and 320.

In some embodiments, it may be advantageous for first transceiver circuit 310 to determine a distance between first and second transceiver circuits 310 and 320. Additionally or alternatively, it may be advantageous for second transceiver circuit 320 to determine a distance between first and second transceiver circuits 310 and 320.

Three methods for distance estimation may be used: Received Signal Strength Indicator (RSSI)-based, time-based, and phase-based measurements.

In RSSI-based methods, the receiver of the signal will calculate its distance to the transmitter based on the attenuation of the transmitted signal over the distance. RSSI-based solutions are very sensitive to multipath fading and other environmental influences such as humidity. In some time-based solutions, the transit time of the signal may be measured directly. Therefore, these methods require highly synchronized clocks to calculate the time between departure and arrival which is impossible in many systems. Moreover, time-based solutions may use a large signal bandwidth in order to have acceptable accuracy in multipath environments, which is incompatible with many narrowband technologies such as Bluetooth Low-Energy (BLE).

In phase-based methods, the amount of signal-phase shifts between transmitter and receiver may be used to calculate the distance between them. In order to mitigate the error due to multipath problem, the phase changes may be measured over multiple frequencies to calculate the distance between them. This procedure is called Multi-Carrier Phase Difference (MCPD). For the MCPD distance estimation, two roles are defined:

Initiator: The device that starts the estimation procedure.
Reflector: The device that responds to the initiator.

Based on how initiator and reflector interact, there are at least two different ways to implement MCPD: One-Way and Two-Way.

One-Way MCPD: The initiator sends continuous Wave (CW) signals to Reflector across the frequency band of interest with a predefined frequency step. The received signals at the reflector are used to estimate the distance between the two devices. This method has errors related to phase incoherency over the whole frequency band of interest.

Two-Way MCPD: The initiator and reflector exchange CW signals at different frequencies across the frequency band of interest in a back and forth ping pong fashion. This method has errors related to phase incoherency only over each individual ping pong communication from initiator to reflector and vice versa, rather than over the whole frequency band of interest.

In the discussion below, the example embodiments illustrate Two-Way MCPD (TWMCPD) method. As understood by those of skill in the art, the principles may also be applied to one-way MCPD.

The TWMCPD method may have three main stages:
Frequency sweep: Initiator and reflector send CW signals to each other at different channel frequencies across the frequency band of interest.
Data transfer (IQ samples transfer): The reflector sends all its received IQ samples back to the initiator.
Distance Estimation: The initiator uses the data to estimate the distance.

Crystal offset affects the accuracy in the distance estimation, as outlined below.

The following notation is used:
The initiator has crystal offset of $\mu_i$.
The reflector has crystal offset of $\mu_r$.
The phase difference between the LO signal of the initiator and the reflector at the start of ranging procedure is $\theta_0$.
The time offset between the initiator and the reflector at the start of ranging procedure is $\Delta t$.
The delay between the transmitted and received tones by the reflector is $T_0$.
$\Delta T_0$ is the variation in $T_0$ between different signal exchanges.
The time difference between the tone exchange in channel $f_k$ and the tone exchange in the next channel $f_k+1$ is $T_f$.
At least because of a frequency offset of F between initiator and reflector.

The Initiator transmits a CW, to the reflector on the first channel, $f_0$. The reflector then performs I/Q measurement on the received carrier, where $\Delta t$ is a time-offset between the initiator and reflector, the phase of the received CW at the reflector is $$\varphi_R(f_0, r) = 2\pi(1+\mu_i)f_0\left(\frac{r}{C} - \Delta t\right) - \theta_0 \pmod{2\pi},$$

Where $\theta_0$ is the phase difference between the LO signal of the initiator and LO signal of the reflector at the start of the ranging procedure.

Following this, the reflector sends back a CW on the same channel, to the initiator. At the initiator, the phase of the received signal is $$\varphi_I(f_0, r) = 2\pi(1+\mu_r)(f_0 + F)\left(\frac{r}{C} + \Delta t\right) + \theta_0 + \theta'_0 \pmod{2\pi},$$

Where $$\theta_1' = 2\pi[(1+\mu_r)(f_0+F)-(1+\mu_i)(f_0)]T_0,$$

The initiator sums up the two phases (using its own IQ samples and the IQ samples sent from the reflector):

$$\varphi_{I+R}(f_0,r) = 4\pi f_0 \frac{r}{C} + 2\pi(\mu_i + \mu_r)f_0\frac{r}{C} +$$
$$2\pi F\left(\frac{r}{C} + \Delta t\right) + 2\pi\mu_r F\frac{r}{C} + 2\pi\Delta t(\mu_r(f_0+F) - \mu_i f_0) + \theta_0' \pmod{2\pi}$$

This equation can be used to estimate the range, but because of the half-wavelength ambiguity, the maximum range ($c/2f_0$) is very small. In order to resolve this issue, this method is implemented at two or more frequencies and results are then subtracted.

For a second frequency, $$\varphi_R(f_1,r) = 2\pi(1+\mu_i)f_1\left(\frac{r}{C} - \Delta t - (\mu_r - \mu_i)T_f\right) - \theta_1 \pmod{2\pi}$$

$$\varphi_I(f_1,r) = 2\pi(1+\mu_r)(f_1+F)\left(\frac{r}{C} + \Delta t + (\mu_r - \mu_i)T_f\right) + \theta_1 + \theta_1' \pmod{2\pi}$$

Where $$\theta_1' = 2\pi[(1+\mu_r)(f_1+F)-(1+\mu_i)(f_1)](T_0+\Delta T_0)$$

The phase $\varphi_{I+R}$ for the second frequency is:

$$\varphi_{I+R}(f_1,r) = 4\pi f_1\frac{r}{C} + 2\pi(\mu_i+\mu_r)f_1\frac{r}{C} + 2\pi F\left(\frac{r}{C} + \Delta t + (\mu_r - \mu_i)T_f\right) +$$
$$2\pi\mu_r F\frac{r}{C} + 2\pi(\Delta t + (\mu_r - \mu_i)T_f)(\mu_r(f_1+F) - \mu_i f_1) + \theta_1' \pmod{2\pi}$$

Accordingly:

$$\Delta\varphi = \varphi_{I+R}(f_1,r) - \varphi_{I+R}(f_0,r) = \frac{4\pi\Delta f}{C}r + 2\pi\Delta f(\mu_i + \mu_r)\frac{r}{C} +$$
$$2\pi\Delta t(\mu_r - \mu_i)\Delta f + 2\pi(\mu_r - \mu_i)T_f((1+\mu_r)F + (\mu_r - \mu_i)f_1) +$$
$$2\pi(\mu_r - \mu_i)\Delta f T_0 + 2\pi[(\mu_r - \mu_i)f_1 + (1+\mu_r)F]\Delta T_0$$

and the estimated range is:

$$\hat{r} = \frac{C}{4\pi\Delta f}\Delta\varphi \left(\bmod \frac{C}{2\Delta f}\right)$$

Therefore, the ambiguity will depend on the frequency difference of both tones.

The estimation error is:

$$e = r - \hat{r} = 0.5C\left[(\mu_i + \mu_r)\frac{r}{C} + \Delta t(\mu_r - \mu_i) + (\mu_r - \mu_i)\left((1+\mu_r)\frac{F}{\Delta f} +\right.\right.$$
$$\left.\left.(\mu_r - \mu_i)\frac{f_1}{\Delta f}\right)T_f + (\mu_r - \mu_i)T_0 + \left((1+\mu_r)\frac{F}{\Delta f} + (\mu_r - \mu_i)\frac{f_1}{\Delta f}\right)\Delta T_0\right]$$

It is clear from the error equation, that much of the error is related to the crystal offset ($\mu_r - \mu_i$) between the initiator and reflector.

Figure 4:
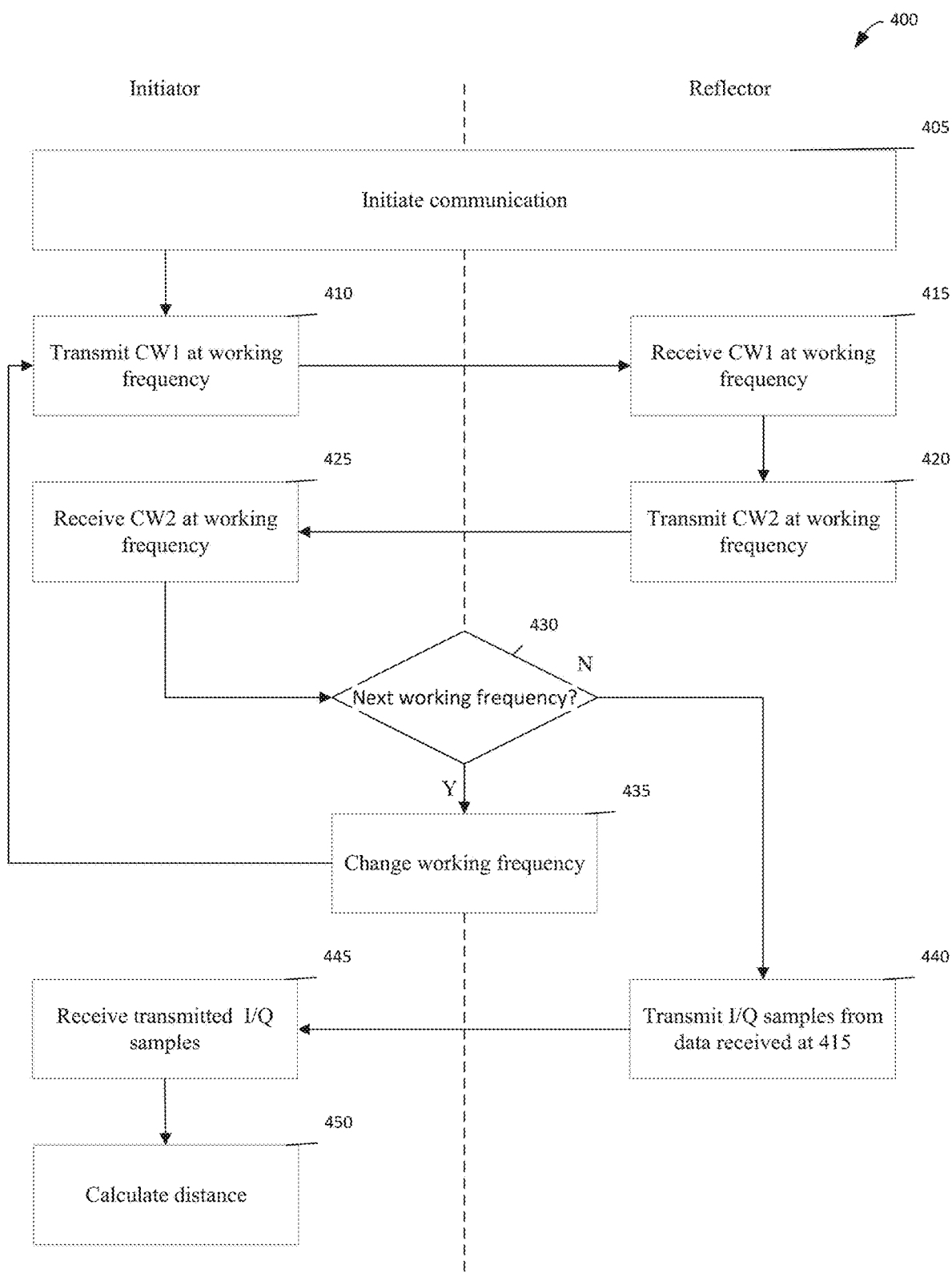
FIG. 4 is a flowchart diagram illustrating a method of determining a distance between first and second transceivers according to some embodiments.

FIG. 4 is a flowchart diagram illustrating a TWMCPD method 400 of determining a distance between first and second transceivers according to some embodiments. Method 400 may be performed by first and second transceiver circuits 310 and 320.

At 405, in response to determining that a distance between the first and second transceiver circuits 310 and 320 is needed or desired, one of the first and second transceiver circuits 310 and 320 communicates with the other of first and second transceiver circuits 310 and 320. The communication may request that the method of 400 be performed. The communication between the first and second transceiver circuits 310 and 320 identifies the one of the first and second transceiver circuits 310 and 320 as the initiator and the other of the first and second transceiver circuits 310 and 320 as the reflector. In addition, the communication between the first and second transceiver circuits 310 and 320 specifies the frequency band of interest and the particular channel frequencies for the back and forth ping pong communications which will be used for the initiator to determine the distance. The communication may specify other conditions for the distance determination process.

At 410, the initiator transceiver circuit transmits a first continuous wave or other signal as a first initiation signal to the reflector transceiver circuit at a first working frequency of the frequency band of interest. In some embodiments, either or both of the first working frequency and the frequency band of interest were communicated at 405. In some embodiments, either or both of the first working frequency and the frequency band of interest are specified by a communications standard.

At 415, the reflector transceiver circuit receives the first continuous wave or other signal from the initiator transceiver circuit at the first working frequency. In addition, the reflector transceiver circuit estimates the carrier frequency offset (CFO). Any method of CFO estimation may be used. For example, the reflector transceiver circuit may find a phase difference between two points of a signal with known time difference, and determine a frequency based on the phase difference, where the frequency=(phase difference)/(2*pi*time difference).

At 415, the reflector transceiver circuit also performs I/Q measurement on the received continuous wave or other signal using the CFO estimate of 415 to compensate for the CFO of the communication.

At 420, the reflector transceiver circuit transmits a second continuous wave or other signal as a first reflection signal to the initiator transceiver circuit at the first working frequency of the frequency band of interest.

In some embodiments, a frequency synthesizer controlling the working frequency for both the receive action of 415 and the transmit action of 420 is set before 415 and is not reset between 415 and 420. Accordingly, a locking circuit, such as a PLL or a DLL, of the frequency synthesizer may be locked before 415 and remain locked throughout 415 and 420.

At 425, the initiator transceiver circuit receives the second continuous wave or other signal from the reflector transceiver circuit at the first working frequency. In addition, the initiator transceiver circuit estimates the carrier frequency offset (CFO). Any method of CFO estimation may be used. At 425, the initiator transceiver circuit also performs I/Q measurement on the received continuous wave or other signal using the estimated CFO to compensate for the CFO in the communication.

In some embodiments, a frequency synthesizer controlling the working frequency for both the transmit action of 410 and the receive action of 425 is set before 410 and is not reset between 410 and 425. Accordingly, a locking circuit, such as a PLL or a DLL, of the frequency synthesizer may be locked before 410 remain locked throughout 410 and 425.

In some embodiments, the order of operations is different. For example, in some embodiments, 420 occurs after 405, 425 occurs after 420, 410 occurs after 425, 415 occurs after 410, and 430 occurs after 415.

At 430, if another working frequency of the frequency band of interest is to be used, at 435, the working frequency is changed, and the method 400 returns to 410. Any total number of working frequencies may be used.

Otherwise, if another working frequency of the frequency band of interest is not to be used, at 440, the reflector transceiver circuit transmits data representing the I/Q measurements made at all occurrences of 415 to the initiator transceiver circuit. The working frequency of the transmission may be the last working frequency used at 410, 415, 420, and 425. In some embodiments, the working frequency of the transmission is another frequency, for example, of the frequency band of interest. The other frequency may have been communicated at 405. In some embodiments, the other frequency is specified by a communications standard.

At 445, the initiator transceiver circuit receives the data transmitted by the reflector transceiver circuit at 440. The initiator transceiver circuit receives the data transmitted from the reflector transceiver circuit at the working frequency. In addition, the initiator transceiver circuit estimates the carrier frequency offset (CFO). Any method of CFO estimation may be used. At 445, the initiator transceiver circuit also performs I/Q measurement on the received transmission using the estimated CFO to compensate for the CFO in the communication.

At 450, the initiator transceiver circuit estimates the distance between the initiator transceiver circuit and the reflector transceiver circuit based on the I/Q data received from the reflector transceiver circuit at 445 and generated at the occurrences of 425. For example, the distance may be estimated according to the equation shown above:

$$\hat{r} = \frac{C}{4\pi\Delta f}\Delta\varphi \left(\mod \frac{C}{2\Delta f}\right)$$

Figure 5:
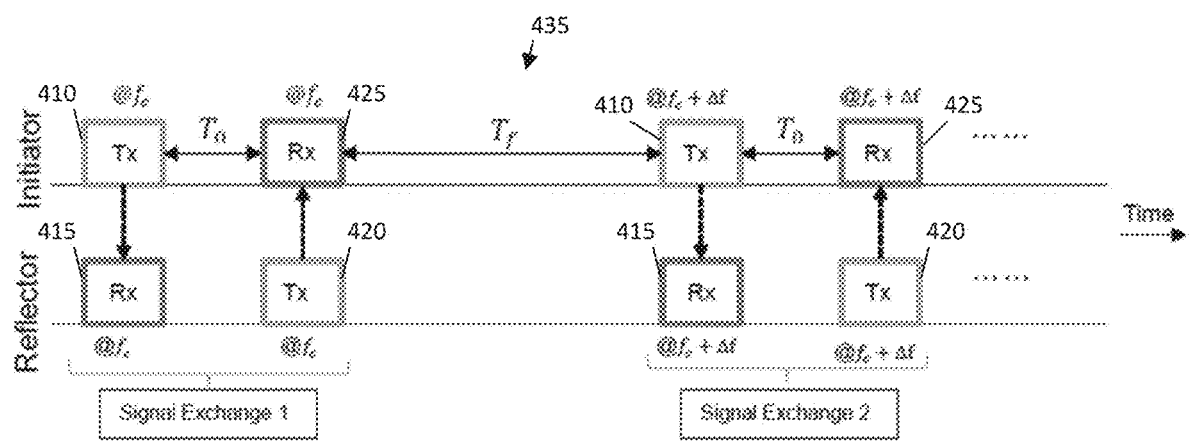
FIG. 5 is a schematic diagram representing the actions of the first and second transceivers performing certain portions of the method of FIG. 4 according to some embodiments.

FIG. 5 is a schematic diagram representing the actions of the first and second transceivers performing certain portions of a ranging event according to the method of FIG. 4 according to some embodiments.

As illustrated, first and second signal exchanges are represented, where each signal exchange includes:
- the initiator circuit transmitting a $1^{st}$ signal at a working frequency, at 410;
- the reflector circuit receiving the $1^{st}$ signal at the working frequency, at 415; after a time $T_0$,
- the reflector circuit transmitting a $2^{nd}$ signal at the working frequency, at 420; and
- the initiator circuit receiving the $2^{nd}$ signal at the working frequency, at 425.

As illustrated, the working frequency of the first signal exchange 1 is fc, and the working frequency of the second signal exchange 2 is fc+Δt. In addition, FIG. 5 illustrates that the second signal exchange 2 happens a time $T_f$ after the first signal exchange 1, where during time $T_f$, the working frequency of the initiator circuit and the reflector circuit is changed from fc to fc+Δt, at 435.

Figure 6:
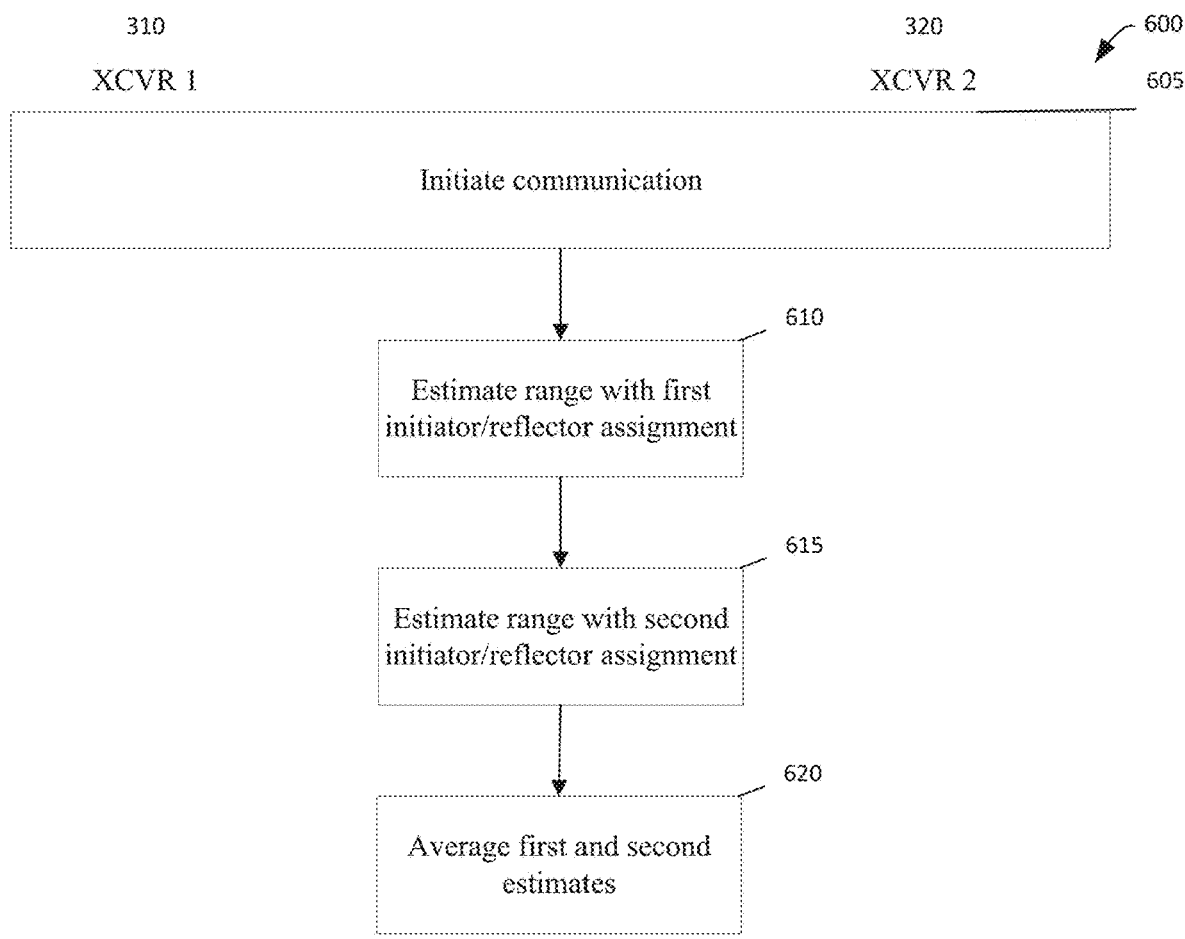
FIG. 6 is a flowchart diagram illustrating a method of determining a distance between first and second transceivers according to some embodiments.

FIG. 6 is a flowchart diagram illustrating a TWMCPD method 600 of determining a distance between first and second transceivers according to some embodiments. Method 600 may be performed by first and second transceiver circuits 310 and 320.

At 605, in response to determining that a distance between the first and second transceiver circuits 310 and 320 is needed or desired, one of the first and second transceiver circuits 310 and 320 communicates with the other of first and second transceiver circuits 310 and 320. The communication may request that the method of 600 be performed. The communication between the first and second transceiver circuits 310 and 320 may identify the one of the first and second transceiver circuits 310 and 320 as the first initiator and as the second reflector and the other of the first and second transceiver circuits 310 and 320 as the first reflector and as the second initiator. In addition, the communication between the first and second transceiver circuits 310 and 320 specifies the frequency band of interest and the particular channel frequencies for the back and forth ping pong communications which will be used for the initiator to determine the distance. The communication may specify other conditions for the distance determination process.

At 610, the first and second transceivers perform a first ranging event, where the distance between the first and second transceiver circuits 310 and 320 is estimated with the one of the first and second transceiver circuits 310 and 320 as the first initiator, and the other of the first and second transceiver circuits 310 and 320 as the first reflector. Any ranging estimation method may be used. For example, method 400 may be used to determine a first range estimate at 610.

Error for the for the first range estimate is:

$$e_1 = 0.5C\left[(\mu_1+\mu_2)\frac{r}{C} + \Delta t(\mu_2-\mu_1) + (\mu_2-\mu_1)\left((1+\mu_2)\frac{F}{\Delta f} + (\mu_2-\mu_1)\frac{f_1}{\Delta f}\right)T_f + (\mu_2-\mu_1)T_0 + \left((1+\mu_2)\frac{F}{\Delta f} + (\mu_2-\mu_1)\frac{f_1}{\Delta f}\right)\Delta T_0\right],$$

where $\mu_1$ is the crystal offset of the first transceiver, and $\mu_2$ is the crystal offset of the second transceiver.

At 615, the first and second transceivers perform a second ranging event, where the distance between the first and second transceiver circuits 310 and 320 is estimated with the one of the first and second transceiver circuits 310 and 320 as the second reflector, and the other of the first and second transceiver circuits 310 and 320 as the second initiator. Any ranging estimation method may be used. For example, method 400 may be used to determine a second range estimate at 615.

Error for the for the second range estimate is:

$$e_2 = 0.5C\left[(\mu_2+\mu_1)\frac{r}{C} + \Delta t(\mu_1-\mu_2) + (\mu_1-\mu_2)\left((1+\mu_1)\frac{F}{\Delta f} + (\mu_1-\mu_2)\frac{f_1}{\Delta f}\right)T_f + (\mu_1-\mu_2)T_0 + \left((1+\mu_1)\frac{F}{\Delta f} + (\mu_1-\mu_2)\frac{f_1}{\Delta f}\right)\Delta T_0\right].$$

At 620, either or both of:
a) the first initiator transmits the first range estimate to the first reflector, and the first reflector calculates a range estimate as the average of the first and second range estimates; and
b) the second initiator transmits the second range estimate to the second reflector, and the second reflector calculates a final range estimate as the average of the first and second range estimates.

Error for the for the final range estimate is:

$$e = 0.5C\left[(\mu_2+\mu_1)\frac{r}{C} + (\mu_1-\mu_2)^2\left(\frac{F}{2\Delta f}+\frac{f_1}{\Delta f}\right)T_f + \left(1+\frac{\mu_1+\mu_2}{2}\right)\frac{F}{\Delta f}\Delta T_0\right].$$

In one example, r=10 m, $\mu_1$=5 ppm, $\mu_2$=25 ppm, $\Delta t$=1 μs, F=10 KHz, $\Delta f$=2 MHz, $f_1$=2402 MHz, $T_f$=1 ms, $T_0$=150 μs, and $\Delta T_0$=0. In this example, $e_1$=0.54 m, $e_2$=—0.40 m, and e=0.07 m.

Figure 7:
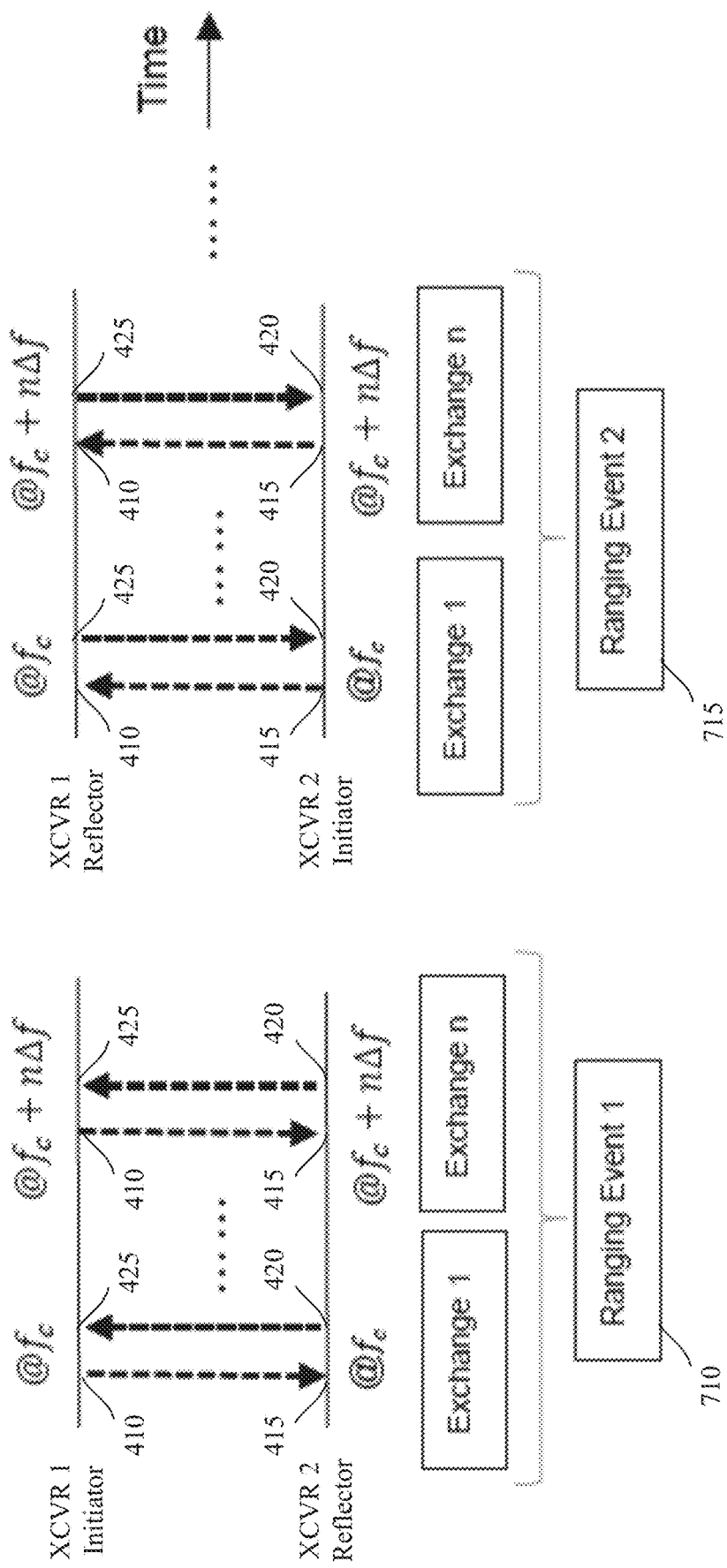
FIG. 7 is a schematic diagram representing the actions of the first and second transceivers performing certain portions of the method of FIG. 6 according to some embodiments.

FIG. 7 is a schematic diagram representing the actions of the first and second transceivers performing certain portions of the method of FIG. 6 according to some embodiments. In the illustrated embodiment, the method of FIG. 6 uses the method of FIG. 4 according to some embodiments for each ranging event.

As illustrated, first and second ranging events 710 and 715 are represented, where each ranging event has any number of two or more signal exchanges, and is used to estimate a range between the first and second transceivers. Each signal exchange includes:

the initiator circuit transmitting a $1^{st}$ signal at a working frequency, at 410;

the reflector circuit receiving the $1^{st}$ signal at the working frequency, at 415;

the reflector circuit transmitting a $2^{nd}$ signal at the working frequency, at 420; and the initiator circuit receiving the $2^{nd}$ signal at the working frequency, at 425.

As illustrated, the working frequency of the first signal exchange of each ranging event is fc, and the working frequency of the nth signal exchange of each ranging event is fc+nΔf.

Figure 8:
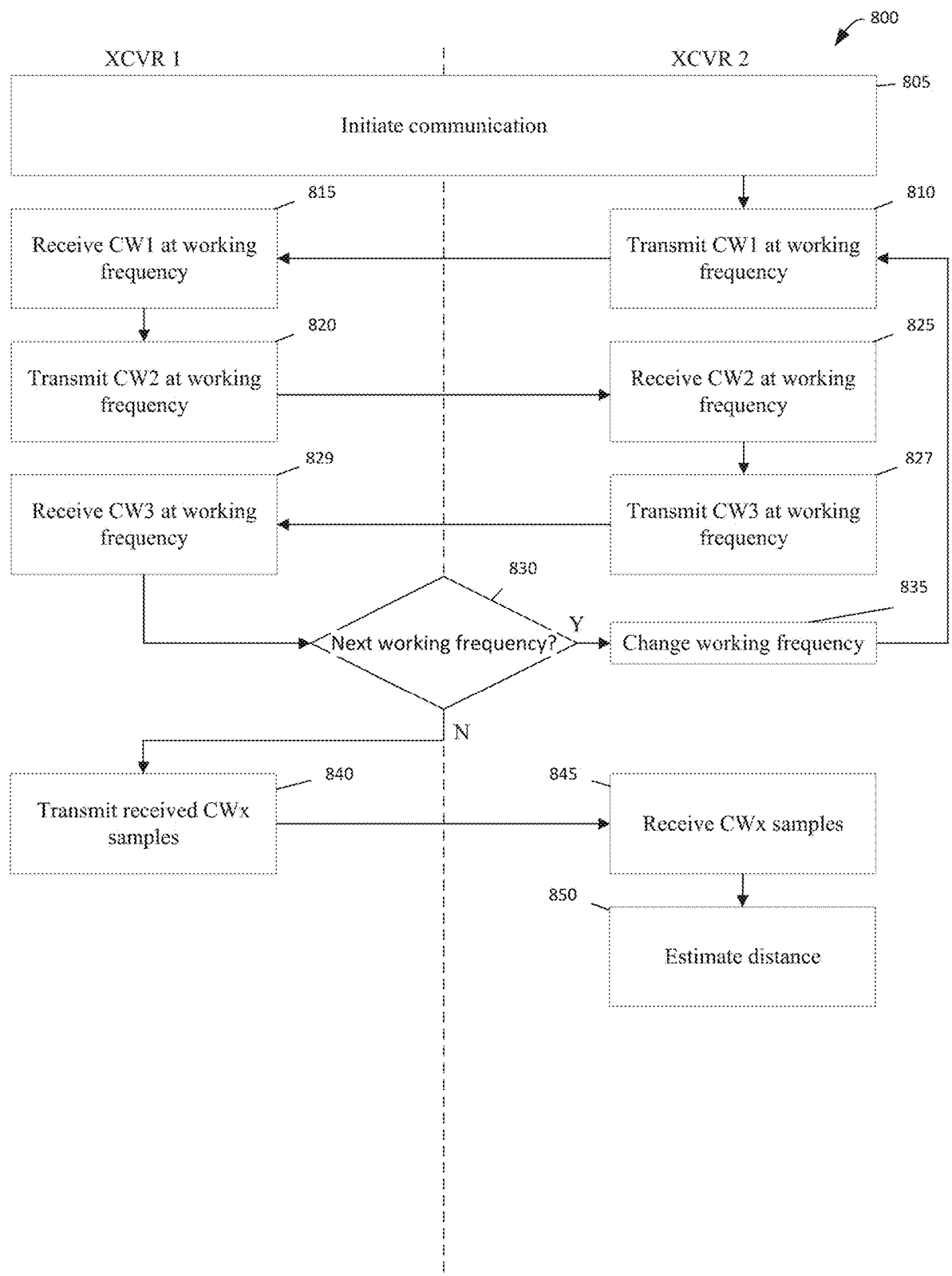
FIG. 8 is a flowchart diagram illustrating a method of determining a distance between first and second transceivers according to some embodiments.

FIG. 8 is a flowchart diagram illustrating a TWMCPD method 800 of determining a distance between first and second transceivers according to some embodiments. Method 800 may be performed by first and second transceiver circuits 310 and 320.

At 805, in response to determining that a distance between the first and second transceiver circuits 310 and 320 is needed or desired, one of the first and second transceiver circuits 310 and 320 communicates with the other of first and second transceiver circuits 310 and 320. The communication may request that the method of 800 be performed. The communication between the first and second transceiver circuits 310 and 320 may identify the one of the first and second transceiver circuits 310 and 320 as the first initiator and as the second reflector and the other of the first and second transceiver circuits 310 and 320 as the first reflector and as the second initiator. In addition, the communication between the first and second transceiver circuits 310 and 320 specifies the frequency band of interest and the particular channel frequencies for the back and forth ping pong communications which will be used for the initiator to determine the distance. The communication may specify other conditions for the distance determination process.

At 810, the first initiator transceiver circuit transmits a first continuous wave or other signal as an initiation signal of a first signal exchange to the first reflector transceiver circuit at a first working frequency of the frequency band of interest. In some embodiments, either or both of the first working frequency and the frequency band of interest were communicated at 805. In some embodiments, either or both of the first working frequency and the frequency band of interest are specified by a communications standard.

At 815, the first reflector transceiver circuit receives the first continuous wave or other signal from the first initiator transceiver circuit at the first working frequency. In addition, the first reflector transceiver circuit also performs I/Q measurement on the received continuous wave.

At 820, the first reflector transceiver circuit transmits a second continuous wave or other signal as an reflection signal of the first signal exchange to the first initiator transceiver circuit at the first working frequency of the frequency band of interest. This transmission also performs a function of the second initiator transceiver circuit transmitting a second continuous wave or other signal as an initiation of a second signal exchange to the second transceiver circuit at the first working frequency of the frequency band of interest.

In some embodiments, a frequency synthesizer controlling the working frequency for both the receive action of 815 and the transmit action of 820 is set before 815 and is not reset between 815 and 820. Accordingly, a locking circuit, such as a PLL or a DLL, of the frequency synthesizer may be locked before 815 and remain locked throughout 815 and 820.

At 825, the first initiator transceiver circuit receives the second continuous wave or other signal from the first reflector transceiver circuit at the first working frequency. In addition, the first initiator transceiver circuit also performs I/Q measurement on the received continuous wave or other signal. This also performs a function of the second transceiver circuit receiving the second continuous wave or other signal from the second initiator transceiver circuit at the first working frequency. In addition, this also performs a function of the second transceiver circuit also performing I/Q measurement on the received continuous wave or other signal.

In some embodiments, a frequency synthesizer controlling the working frequency for both the transmit action of 810 and the receive action of 825 is set before 810 and is not reset between 810 and 825. Accordingly, a locking circuit, such as a PLL or a DLL, of the frequency synthesizer may be locked before 810 remain locked throughout 810 and 825.

At 827, the second reflector transceiver circuit transmits a third continuous wave or other signal as an reflection signal of the second signal exchange to the second initiator transceiver circuit at the first working frequency of the frequency band of interest.

In some embodiments, a frequency synthesizer controlling the working frequency for both the transmit action of 810, the receive action of 825, and the transmit action of 827 is set before 810 and is not reset between 810 and 827. Accordingly, a locking circuit, such as a PLL or a DLL, of the frequency synthesizer may be locked before 810 remain locked throughout 810, 825, and 827.

At 829, the second initiator transceiver circuit receives the third continuous wave or other signal from the second reflector transceiver circuit at the first working frequency. In addition, the second initiator transceiver circuit also performs I/Q measurement on the received continuous wave or other signal.

In some embodiments, a frequency synthesizer controlling the working frequency for all of the receive action of 815, the transmit action of 820, and the receive action of 829 is set before 815 and is not reset between 815 and 829. Accordingly, a locking circuit, such as a PLL or a DLL, of the frequency synthesizer may be locked before 815 and remain locked throughout 815, 820, and 829.

At 830, if another working frequency of the frequency band of interest is to be used, at 835, the working frequency is changed, and the method 800 returns to 810. Any total number of working frequencies may be used.

Otherwise, if another working frequency of the frequency band of interest is not to be used, at 840, the second initiator transceiver circuit transmits data representing the I/Q measurements made at the occurrences of 815 and 829 to the first initiator transceiver circuit. The working frequency of the transmission may be the last working frequency used at 810, 815, 820, 825, 827, and 829. In some embodiments, the working frequency of the transmission is another frequency, for example, of the frequency band of interest. The other frequency may have been communicated at 805. In some embodiments, the other frequency is specified by a communications standard.

At 845, the first initiator transceiver circuit receives the data transmitted by the second initiator transceiver circuit at 840. The first initiator transceiver circuit may receive the data transmitted from the second initiator transceiver circuit at the working frequency.

At 850, the first initiator circuit estimates the distance between the first and second transceiver circuits to generate a distance estimate based on the I/Q measurements made at the occurrences of 815, 825, and 829.

In some embodiments, the first initiator circuit estimates the distance between the first and second transceiver circuits based on the following.

The I/Q data measurements made at 815 at a first working frequency, indicate a phase $$\varphi_{R1}(f_0,r) = 2\pi(1+\mu_i)f_0\left(\frac{r}{C} - \Delta t\right) - \theta_0 \pmod{2\pi},$$

where $\theta_0$ is the phase difference between the LO signal of the initiator and the reflector at the start of the ranging procedure.

The I/Q data measurements made at 825 at the first working frequency, indicate a phase $$\varphi_I(f_0,r) = 2\pi(1+\mu_r)(f_0+F)\left(\frac{r}{C} + \Delta t\right) + \theta_0 + \theta'_0 \pmod{2\pi}, \text{ where}$$

$$\theta'_0 = 2\pi[(1+\mu_r)(f_0+F) - (1+\mu_i)(f_0)]T_0.$$

The I/Q data measurements made at 829 at the first working frequency, indicate a phase $$\varphi_{R2}(f_0,r) = 2\pi(1+\mu_i)f_0\left(\frac{r}{C} - \Delta t\right) - \theta_0 - \theta'_0 - \theta''_0 \pmod{2\pi},$$

where $\theta_0'' = 2\pi[(1+\mu_r)(f_0+F) - (1+\mu_i)(f_0)]T_0 = \theta_0'$.

Instead of using $\varphi_{I+R}(f_0,r)$ to calculate range, $$\varphi_{I+R}(f_0,r) = \frac{\varphi_{I+R1}(f_0,r)}{2} + \frac{\varphi_{R2+I}(f_0,r)}{2}$$

is used, where $$\varphi_{I+R1}(f_0,r) = 4\pi f_0\frac{r}{C} + 2\pi(\mu_i+\mu_r)f_0\frac{r}{C} +$$
$$2\pi F\left(\frac{r}{C}+\Delta t\right) + 2\pi\mu_r F\frac{r}{C} + 2\pi\Delta t(\mu_r(f_0+F)-\mu_i f_0) + \theta'_0 \pmod{2\pi},$$

and $$\varphi_{R2+I}(f_0,r) = 4\pi f_0\frac{r}{C} + 2\pi(\mu_i+\mu_r)f_0\frac{r}{C} +$$
$$2\pi F\left(\frac{r}{C}+\Delta t\right) + 2\pi\mu_r F\frac{r}{C} + 2\pi\Delta t(\mu_r(f_0+F)-\mu_i f_0) - \theta'_0 \pmod{2\pi}.$$

Therefore, $$\varphi_{I+R}(f_0,r) = 4\pi f_0\frac{r}{C} + 2\pi(\mu_i+\mu_r)f_0\frac{r}{C} +$$
$$2\pi F\left(\frac{r}{C}+\Delta t\right) + 2\pi\mu_r F\frac{r}{C} + 2\pi\Delta t(\mu_r(f_0+F)-\mu_i f_0) \pmod{2\pi}.$$

The I/Q data measurements made at 815 at a second working frequency, indicate a phase $$\phi_{R1}(f_1,r) = 2\pi(1+\mu_i)f_1\left(\frac{r}{C} - \Delta t - (\mu_r-\mu_i)T_f\right) - \theta_1 \pmod{2\pi}.$$

The I/Q data measurements made at 825 at the second working frequency, indicate a phase $$\varphi_I(f_1,r) = 2\pi(1+\mu_r)(f_1+F)\left(\frac{r}{C} + \Delta t + (\mu_r-\mu_i)T_f\right) + \theta_1 + \theta'_1 \pmod{2\pi}.$$

Therefore, $$\varphi_{R1}(f_1,r) = 2\pi(1+\mu_i)f_1\left(\frac{r}{C} - \Delta t - (\mu_r-\mu_i)T_f\right) - \theta_1 - \theta'_1 - \theta'_1 \pmod{2\pi},$$

where $\theta'_1 = 2\pi[(1+\mu_r)(f_1+F) - (1+\mu_i)(f_1)](T_0+\Delta T_0)$.

The phase $\varphi_{I+R}$ for the second working frequency is $$\varphi_{I+R}(f_1,r) = \frac{\varphi_{I+R1}(f_1,r)}{2} + \frac{\varphi_{R2+I}(f_1,r)}{2} =$$
$$4\pi f_1\frac{r}{C} + 2\pi(\mu_i+\mu_r)f_1\frac{r}{C} + 2\pi F\left(\frac{r}{C}+\Delta t+(\mu_r-\mu_i)T_f\right) +$$
$$2\pi\mu_r F\frac{r}{C} + 2\pi(\Delta t+(\mu_r-\mu_i)T_f)(\mu_r(f_1+F)-\mu_i f_1) \pmod{2\pi}.$$

The phase difference of the first and second working frequencies is $$\Delta\varphi = \varphi_{I+R}(f_1,r) - \varphi_{I+R}(f_0,r) = \frac{4\pi\Delta f}{C}r + 2\pi\Delta f(\mu_i+\mu_r)\frac{r}{C} +$$
$$2\pi\Delta t(\mu_r-\mu_i)\Delta f + 2\pi(\mu_r-\mu_i)T_f((1+\mu_r)F+(\mu_r-\mu_i)f_1),$$

and the estimated range is $$\hat{r} = \frac{c}{4\pi\Delta f}\Delta\varphi \ \left(\text{mod } \frac{c}{2\Delta f}\right),$$

where the estimation error is:

$$e = r - \hat{r} =$$

$$0.5C\left[(\mu_i + \mu_r)\frac{r}{C} + \Delta t(\mu_r - \mu_i) + (\mu_r - \mu_i)\left((1 + \mu_r)\frac{F}{\Delta f} + (\mu_r - \mu_i)\frac{f_1}{\Delta f}\right)T_f\right].$$

In one example, r=10 m, $\mu_1$=5 ppm, $\mu_2$=25 ppm, $\Delta$t=1 µs, F=10 KHz, $\Delta$f=2 MHz, $f_1$=2402 MHz, $T_f$=1 ms, $T_0$=150 µs, and $\Delta T_0$=0. In this example, $e_1$=0.54 m, $e_2$=−0.40 m, and e=0.09 m.

In the illustrated embodiment, operations 810, 815, 820, and 825 are part of a first signal exchange where the second transceiver circuit XCVR 2 is the initiator and the first transceiver circuit XCVR 1 is the reflector. Furthermore, in the illustrated embodiment, operations 820, 825, 827, and 829 are part of a second signal exchange where the first transceiver circuit XCVR 1 is the initiator and the second transceiver circuit XCVR 2 is the reflector.

In alternative embodiments, roles of the first and second transceiver circuits XCVR 1 and XCVR 2 are reversed for one or more operations.

Figure 9:
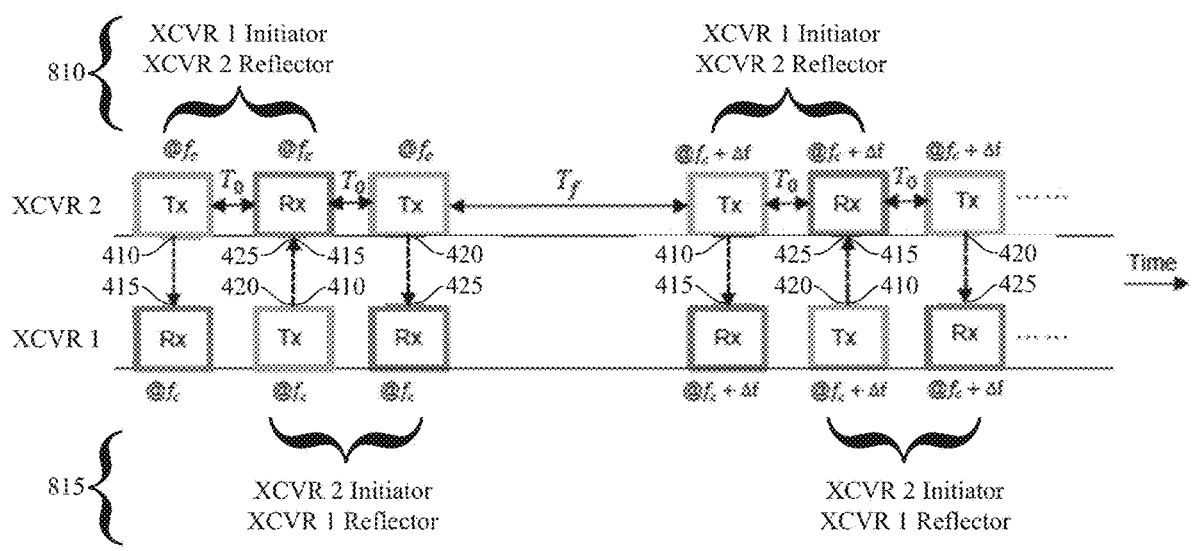
FIG. 9 is a schematic diagram representing the actions of the first and second transceivers performing certain portions of the method of FIG. 8 according to some embodiments.

FIG. 9 is a schematic diagram representing the actions of the first and second transceivers performing certain portions of first and second ranging events according to the method of FIG. 8 according to some embodiments. In the illustrated embodiment, the method of FIG. 8 uses the method of FIG. 4 according to some embodiments for each ranging event.

As illustrated, portions 810 and 815 of first and second ranging events are represented, where each ranging event has any number of two or more signal exchanges, and is used to estimate a range between the first and second transceivers. Each signal exchange includes:

the initiator circuit transmitting a $1^{st}$ signal at a working frequency, at 410;

the reflector circuit receiving the $1^{st}$ signal at the working frequency, at 415;

the reflector circuit transmitting a $2^{nd}$ signal at the working frequency, at 420; and the initiator circuit receiving the $2^{nd}$ signal at the working frequency, at 425.

As illustrated, the working frequency of the first signal exchange of each ranging event is fc, and the working frequency of the second signal exchange of each ranging event is fc+n$\Delta$f.

As illustrated, during the transmission of second transceiver XCVR 2 to the first transceiver XCVR 1 at the first working frequency fc, the first transceiver XCVR 1 functions as the initiator in the signal exchange for the portion 810 of the first ranging event and the second transceiver XCVR 2 functions as the reflector in the signal exchange for the portion 810 of the first ranging event. Also, during the transmission of second transceiver XCVR 2 to the first transceiver XCVR 1 at the first working frequency fc, the first transceiver XCVR 1 functions as the reflector in the signal exchange for the portion 815 of the second ranging event and the second transceiver XCVR 2 functions as the initiator in the signal exchange for the portion 815 of the second ranging event.

Similarly, during the transmission of second transceiver XCVR 2 to the first transceiver XCVR 1 at the second working frequency fc+n$\Delta$f, the first transceiver XCVR 1 functions as the initiator in the signal exchange for the portion 810 of the first ranging event and the second transceiver XCVR 2 functions as the reflector in the signal exchange for the portion 810 of the first ranging event. Also, during the transmission of second transceiver XCVR 2 to the first transceiver XCVR 1 at the second working frequency fc+n$\Delta$f, the first transceiver XCVR 1 functions as the reflector in the signal exchange for the portion 815 of the second ranging event and the second transceiver XCVR 2 functions as the initiator in the signal exchange for the portion 815 of the second ranging event.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A transceiver circuit, comprising:
    an antenna;
    a receiver RF chain configured to receive a receiver RF signal from the antenna;
    a transmitter RF chain configured to transmit a transmitter RF signal to the antenna; and
    a controller configured to:
    cause the receiver RF chain to receive, from another transceiver circuit, a first distance estimate between the antenna and the other transceiver circuit,
    calculate a second distance estimate between the antenna and the other transceiver circuit,
    determine a range estimate between the antenna and the other transceiver circuit based on the first distance estimate and the second distance estimate,
    cause the transmitter RF chain to transmit a first initiation signal to the other transceiver circuit, wherein the first initiation signal is part of a first signal exchange, cause the receiver RF chain to receive a first reflection signal from the other transceiver circuit, wherein the first reflection signal is part of the first signal exchange, cause the receiver RF chain to receive a second initiation signal from the other transceiver circuit, wherein the second initiation signal is part of a second signal exchange, and cause the transmitter RF chain to transmit a second reflection signal to the other transceiver circuit, wherein the second reflection signal is part of the second signal exchange.

2. The transceiver circuit of claim 1, wherein the range estimate is equal to the average of the first distance estimate and the second distance estimate.

3. The transceiver circuit of claim 1, wherein the controller is configured to calculate the second distance estimate based at least in part on the first initiation signal and the first reflection signal.

4. The transceiver circuit of claim 1, wherein the first initiation signal and the second reflection signal are transmitted at a particular working frequency, and wherein the first reflection signal and the second initiation signal are received at the particular working frequency.

5. The transceiver circuit of claim 1, wherein the controller is configured to:
cause the transmitter RF chain to transmit a third initiation signal to the antenna, wherein the third initiation signal is part of a third signal exchange,
cause the receiver RF chain to receive a third reflection signal from the antenna, wherein the third reflection signal is part of the third signal exchange,
cause the receiver RF chain to receive a fourth initiation signal from the antenna, wherein the fourth initiation signal is part of a fourth signal exchange,
cause the transmitter RF chain to transmit a fourth reflection signal from the antenna, wherein the fourth reflection signal is part of the fourth signal exchange, and
calculate the first distance estimate based at least in part on the third initiation signal and the third reflection signal.

6. The transceiver circuit of claim 5, wherein the controller is configured to calculate the second distance estimate based at least in part on the third initiation signal and the third reflection signal.

7. The transceiver circuit of claim 5, wherein the first initiation signal and the second reflection signal are transmitted at a particular working frequency, wherein the first reflection signal and the second initiation signal are received at the particular working frequency, wherein the third initiation signal and the fourth reflection signal are transmitted at a second particular working frequency, and wherein the third reflection signal and the fourth initiation signal are received at the second particular working frequency.

8. A system, comprising:
first and second transceiver circuits,
wherein the first transceiver circuit comprises:
an antenna,
a receiver RF chain configured to receive a receiver RF signal from the antenna,
a transmitter RF chain configured to transmit a transmitter RF signal to the antenna, and
a controller configured to:
cause the receiver RF chain to receive, from the second transceiver circuit, a first distance estimate between the antenna and the second transceiver circuit,
calculate a second distance estimate between the antenna and the second transceiver circuit,
determine a range estimate between the antenna and the second transceiver circuit based on the first distance estimate and the second distance estimate,
cause the transmitter RF chain to transmit a first initiation signal to the second transceiver circuit, wherein the first initiation signal is part of a first signal exchange,
cause the receiver RF chain to receive a first reflection signal from the second transceiver circuit, wherein the first reflection signal is part of the first signal exchange,
cause the receiver RF chain to receive a second initiation signal from the second transceiver circuit, wherein the second initiation signal is part of a second signal exchange, and
cause the transmitter RF chain to transmit a second reflection signal to the second transceiver circuit, wherein the second reflection signal is part of the second signal exchange,
wherein the second transceiver circuit comprises:
a second antenna,
a second receiver RF chain configured to receive a second receiver RF signal from the second antenna,
a second transmitter RF chain configured to transmit a second transmitter RF signal to the second antenna, and
a second controller configured to calculate the first distance estimate between the antenna and the first transceiver circuit, and to cause the second transmitter RF chain to transmit the first distance estimate between the antenna and the first transceiver circuit to the first transceiver circuit.

9. The system of claim 8, wherein calculating the first distance estimate comprises:
the second controller causing the second receiver RF chain to receive the first initiation signal from the second antenna, wherein the first initiation signal is part of the first signal exchange,
the second controller causing the second transmitter RF chain to transmit the first reflection signal to the first transceiver circuit, wherein the first reflection signal is part of the first signal exchange,
the second controller causing the second transmitter RF chain to transmit the second initiation signal to the first transceiver circuit, wherein the second initiation signal is part of the second signal exchange,
the second controller causing the second receiver RF chain to receive the second reflection signal from the first transceiver circuit, wherein the second reflection signal is part of the second signal exchange, and
the second controller determining the first distance estimate based at least in part on the first and second initiation signals and the first and second reflection signals.

10. The system of claim 9, wherein the first initiation signal and the second reflection signal are transmitted at a particular working frequency, and wherein the first reflection signal and the second initiation signal are received at the particular working frequency.

11. The system of claim 9, wherein the second controller is configured to:

cause the second receiver RF chain to receive a third initiation signal from the first transceiver circuit, wherein the third initiation signal is part of a third signal exchange, cause the second transmitter RF chain to transmit a third reflection signal to the first transceiver circuit, wherein the third reflection signal is part of the third signal exchange, cause the second transmitter RF chain to transmit a fourth initiation signal to the first transceiver circuit, wherein the fourth initiation signal is part of a fourth signal exchange, cause the second receiver RF chain to receive a fourth reflection signal from the first transceiver circuit, wherein the fourth reflection signal is part of the fourth signal exchange.

12. The system of claim 11, wherein the second controller is configured to calculate the first distance estimate based at least in part on the third initiation signal and the third reflection signal.

13. The system of claim 11, wherein the first initiation signal and the second reflection signal are transmitted at a particular working frequency, wherein the first reflection signal and the second initiation signal are received at the particular working frequency, wherein the third initiation signal and the fourth reflection signal are transmitted at a second particular working frequency, and wherein the third reflection signal and the fourth initiation signal are received at the second particular working frequency.

* * * * *